April 20, 1948.     H. F. FLOWERS     2,439,801
RAIL VEHICLE HAVING AXLELESS TRUCKS
Filed Oct. 25, 1944     5 Sheets-Sheet 1
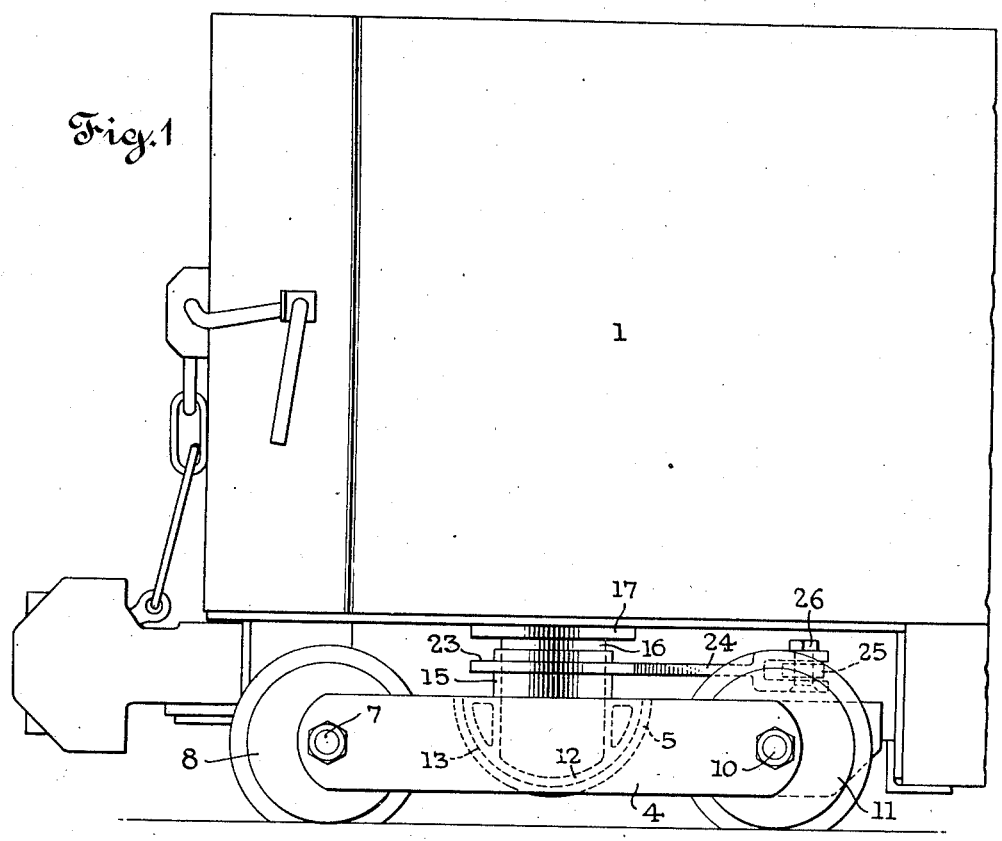
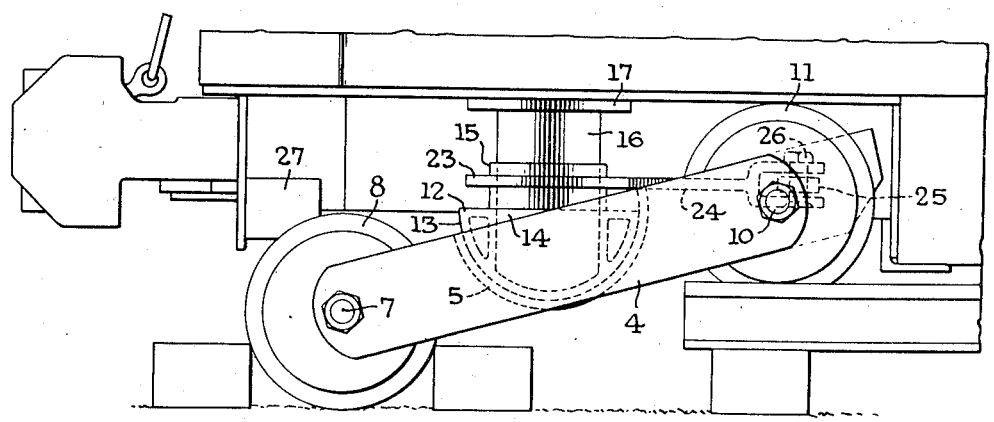
Inventor
*Henry Fort Flowers*
By
*Mason, Porter & Diller*
Attorneys

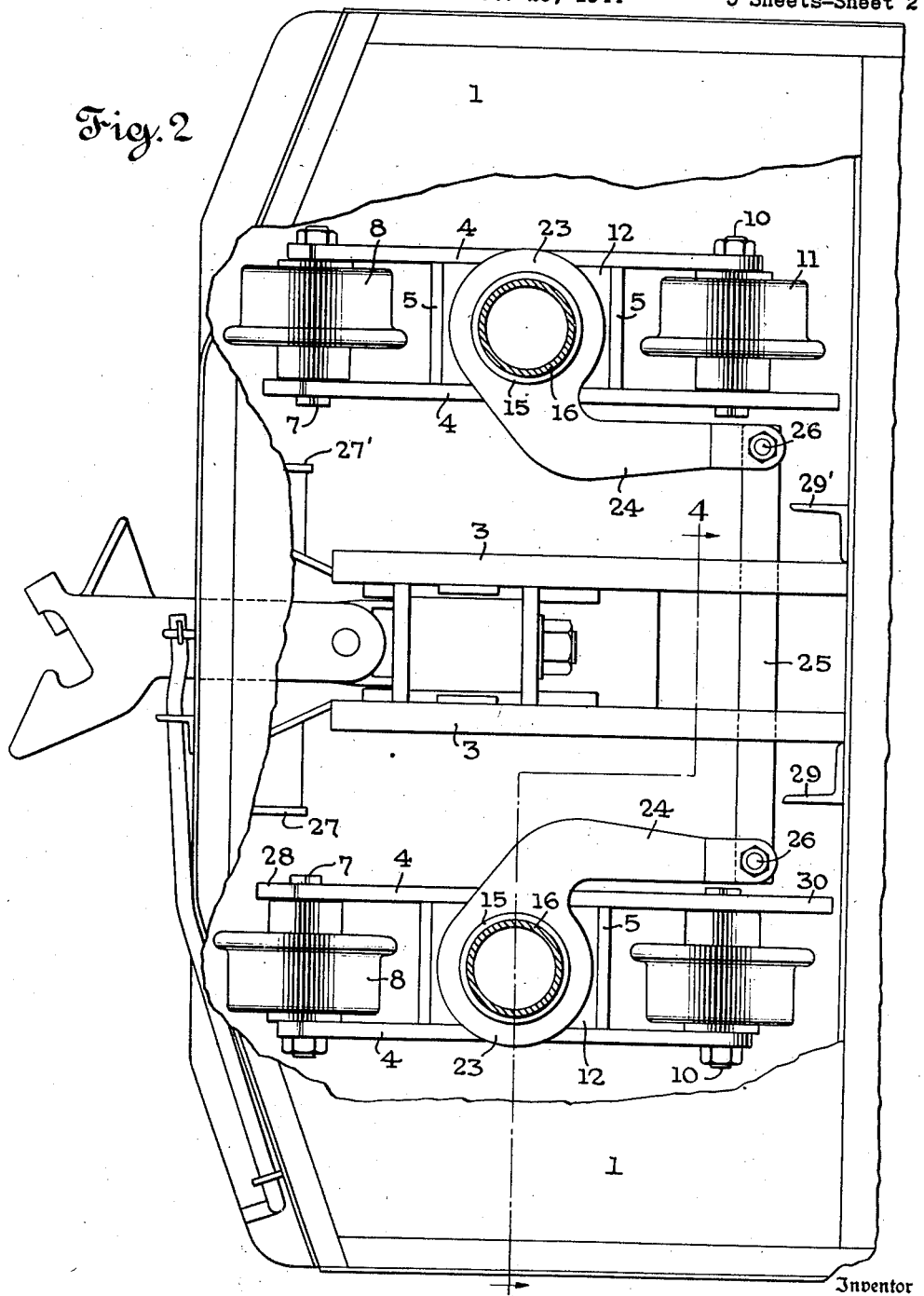

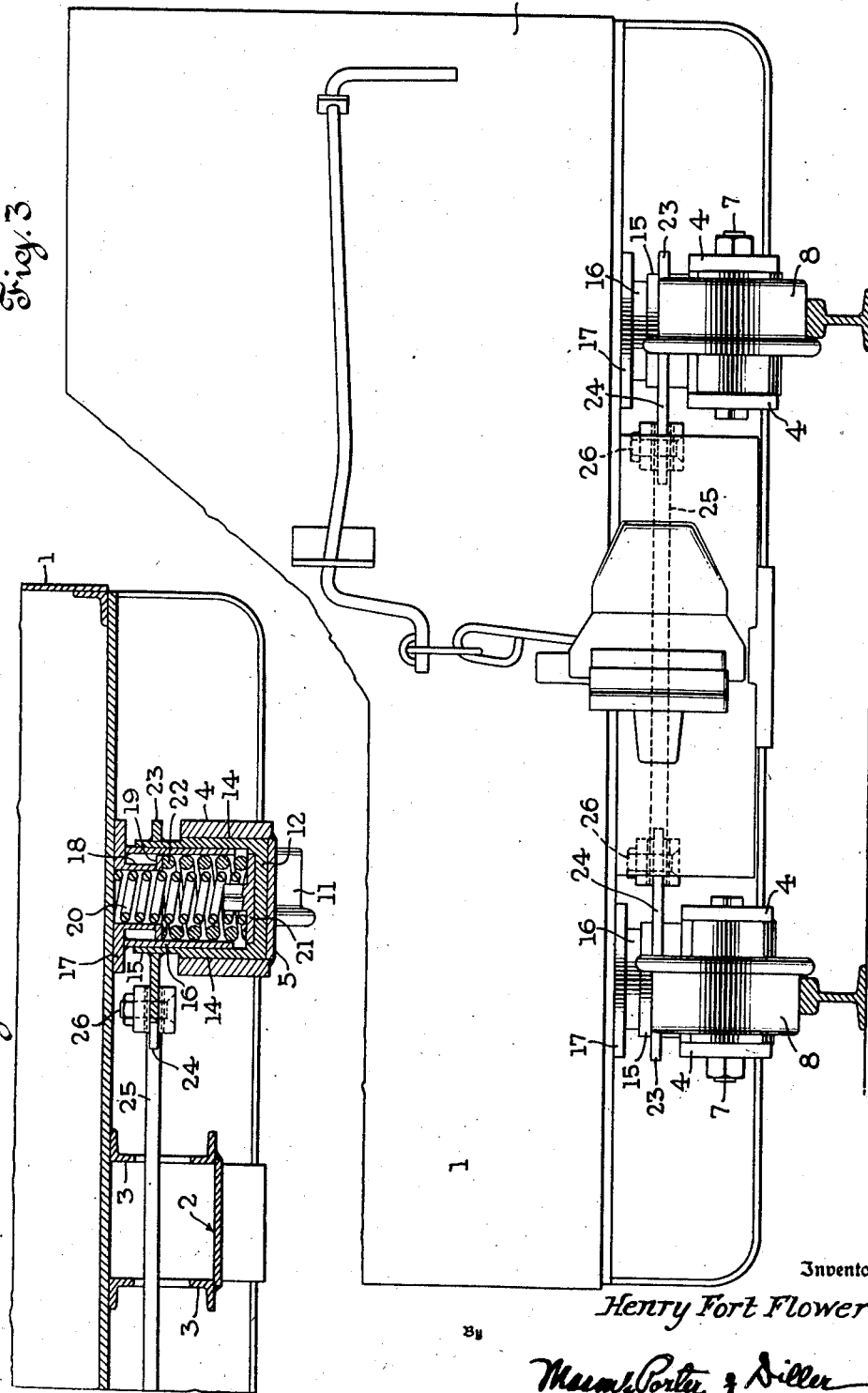

April 20, 1948.  H. F. FLOWERS  2,439,801
RAIL VEHICLE HAVING AXLELESS TRUCKS
Filed Oct. 25, 1944  5 Sheets-Sheet 4
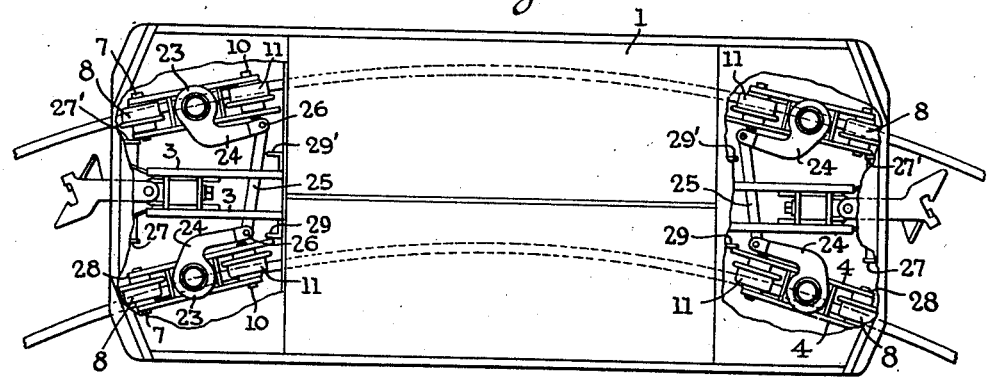
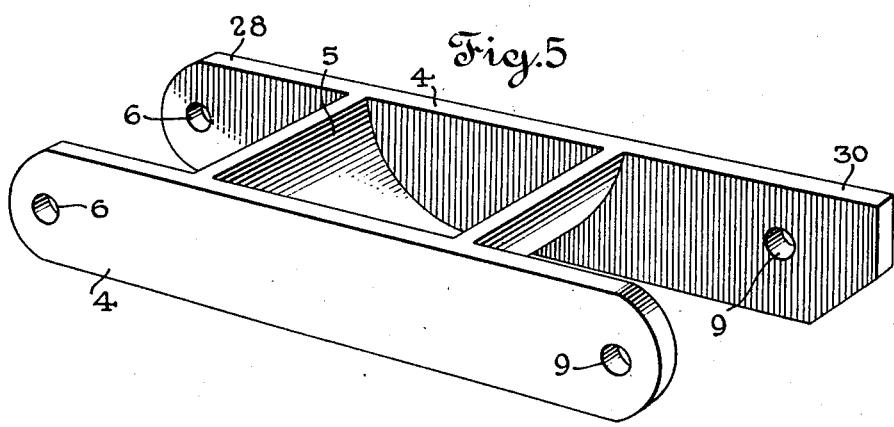
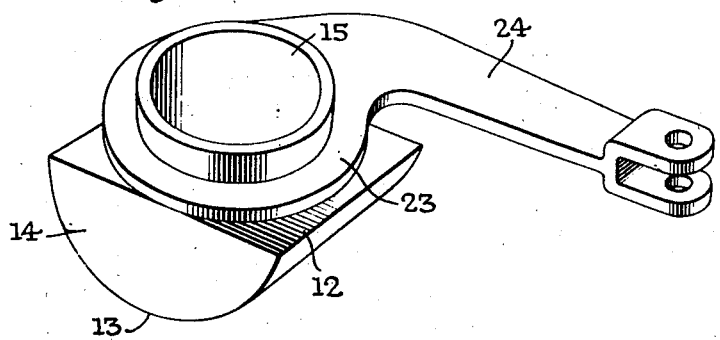
Inventor
*Henry Fort Flowers*
By
*Mason, Porter & Diller*
Attorneys April 20, 1948.   H. F. FLOWERS   2,439,801
RAIL VEHICLE HAVING AXLELESS TRUCKS
Filed Oct. 25, 1944   5 Sheets-Sheet 5

Inventor
Henry Fort Flowers

By
Mason, Porter & Diller
Attorneys

Patented Apr. 20, 1948

2,439,801

UNITED STATES PATENT OFFICE 2,439,801

RAIL VEHICLE HAVING AXLELESS TRUCKS

Henry Fort Flowers, Findlay, Ohio

Application October 25, 1944, Serial No. 560,278

9 Claims. (Cl. 105—179)

1

The invention relates to new and useful improvements in a rail vehicle provided with supporting axleless trucks having a tie bar connecting opposed trucks so that the turning movements of one truck are imparted to the other.

An object of the invention is to provide a tie bar connection with the wheel frames of opposed trucks which is so constructed as to permit each truck to oscillate about a horizontal axis without imparting any twisting movement to the tie bar.

A further object of the invention is to provide a tie bar construction for opposed axleless trucks which is so disposed that the oscillations of the wheel frames clear the tie bar so that excessive movements of the wheel frames, in case the vehicle is accidentally pushed off the end of the rail at a loading station, will not in any way strain the tie bar connection.

A still further object of the invention is to provide a tie bar connection which is so disposed as to swing the truck on the inside rail when traveling about a curve through a greater angle than the truck on the outside rail, so as to insure that the wheels adjacent the center of the car do not drop between the rails.

Still another object of the invention is to provide stops on the vehicle body so disposed as to limit the swinging of the trucks about their respective vertical axes.

These and other objects will in part be obvious and will in part be hereinafter more fully disclosed.

In the drawings,

Fig. 1 is a side view of a portion of a rail vehicle embodying my improvements.

Fig. 2 is a plan view with the floor of the vehicle body broken away and certain parts sectioned so as to show the tie bar connection between the body supports of opposed trucks.

Fig. 3 is an end view of a portion of a rail vehicle embodying the improvements.

Fig. 4 is a section on the line 4—4 of Fig. 2.

Fig. 5 is a view in perspective showing diagrammatically the construction of the wheel frame.

Fig. 6 is a view showing diagrammatically the body support of a wheel frame and the arm connected thereto to which the tie bar is in turn connected.

Fig. 7 is a view showing more or less diagrammatically a vehicle moving along a curved track and the positioning of the trucks during such movement.

Fig. 8 is a view similar to Fig. 1 but showing the front wheels of the trucks moved off the end of the rail at a loading station and as having dropped into engagement with the rail supporting bed.

Fig. 9 is a view showing a modified form of means for limiting the turning movement of the

2 truck, said view being in section similar to line 4—4 of Fig. 2.

Figure 10:
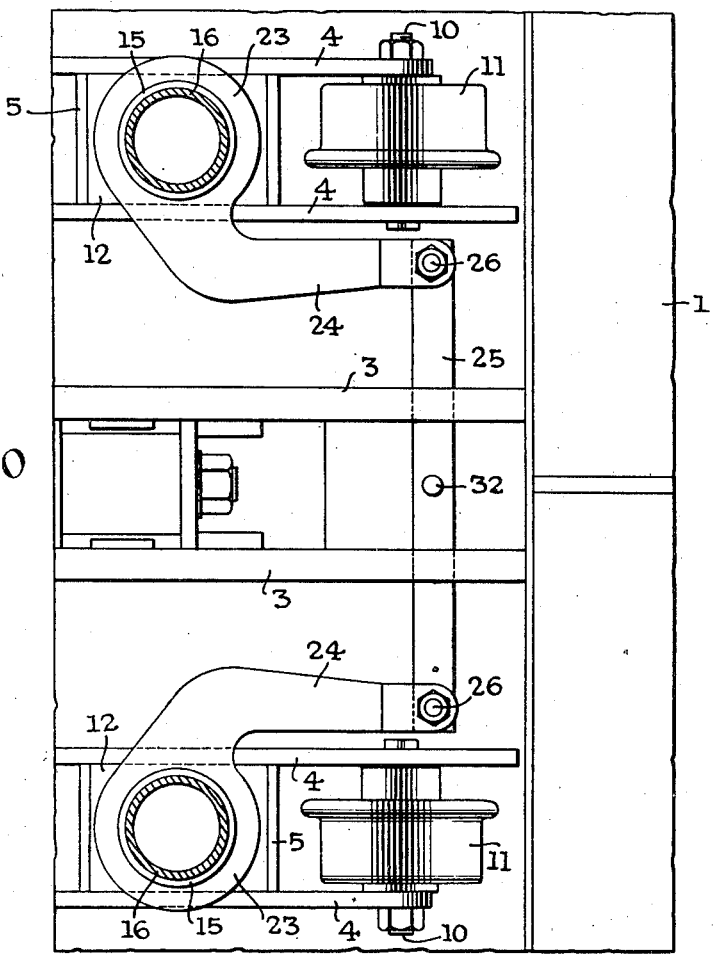

Fig. 10 is a plan view of a modified form of stop for limiting the turning movement of the trucks.

The invention is shown as applied to a rail vehicle which is of the usual construction. Said vehicle includes a body 1 which includes a suitable underframe structure. The underframe structure is provided with a center sill 2 which includes channels 3, 3, spaced from each other.

The vehicle underframe is provided at each end and at opposite sides thereof with an axleless truck. As shown in the present embodiment of the invention, each truck includes a wheel frame having side members 4, 4. These side members 4, 4, are connected by a curved plate 5 which is preferably welded to the side members. This frame structure may be made in any suitable way.

The side members 4, 4, at one end thereof are provided with openings 6, 6, in which is supported a spindle 7 on which the flanged wheel 8 is mounted. There are similar openings 9, 9, at the other ends of the side members of the wheel frame in which a spindle 10 is mounted carrying a flanged wheel 11. These flanged wheels are of the usual construction for travel on a rail.

Mounted on the curved supporting plate 5 is a body supporting member 12. This body supporting member, as shown diagrammatically in Fig. 6, has a curved face 13 which conforms to the curvature of the plate 5. The body supporting member has parallel vertical faces 14 which engage the inner face of side members 4, 4, of the wheel frame. The wheel frame is capable of oscillation about the center of the curved plate 5 and the curved face 13. This is referred to as the axis of oscillation of the wheel frame in a vertical plane.

The body supporting member as illustrated in Fig. 4 is an integral structure, but it is understood that it may be made of plates welded together in any suitable way.

The body supporting member terminates at its upper end in a sleeve 15 which telescopes over a sleeve 16 rigidly secured to a plate 17 which in turn is attached to the underframe of the vehicle body. This plate 17 has a depending sleeve 18 which extends down into the sleeve 16 and is provided with a flanged abutment 19. A spring 20 abuts against the underframe of the vehicle at its upper end and against the supporting plate 21 disposed within the body supporting member 12.

There is an outer spring 22 which abuts against the flange 19 at its upper end and which rests at its lower end on the supporting plate 21. These springs carry the vehicle body and form a yielding support therefor so that the vehicle body can move up and down on the body supporting member 12.

The body member is free to oscillate on the depending sleeve 16 carried by the underframe of the vehicle body. This permits the truck to turn about a vertical axis and follow the curvature of the rail.

Rigidly attached to the sleeve 15 is a bracket 23 carrying an arm 24 which extends in a direction substantially parallel with the wheel frame and terminates adjacent the spindle carrying the trailing wheels of the trucks. As previously described, there is a truck at each side of the vehicle body and these trucks are alike in construction. The arms 24 of the opposed trucks are on the inside of the trucks and they are connected by a tie bar 25 which is secured to the forked ends of the arms by pivot bolts 26, 26. This supporting bracket 23 is rigidly attached to the body supporting member and, therefore, when one truck turns about a vertical axis, movement is imparted to the other truck about a vertical axis.

It will be noted that the body supporting member has flat side plates 14, 14, which are parallel and which engage the parallel side frames 4, 4, of the wheel truck and, therefore, any turning movement of one truck about a vertical axis, due to the flanges of the wheels following the curved section of the track, will in turn impart a similar oscillation about a vertical axis to the body supporting member and, through the tie bar and the other body supporting member, an oscillation will be imparted to the wheel frame on the opposite side of the vehicle body. This will maintain the wheels of the opposite wheel frame in proper engagement with the opposed rail.

It will be noted also that the bracket 23 is well above the truck frame and the arms 24 are disposed at one side of the truck frame so that the truck frame is free to oscillate about a horizontal axis without imparting any strain whatever to the tie bar. Even if the front wheels of a truck run off the end of the rail at a loading station and drop down onto the bed supporting the rail, as shown in Fig. 8, still there is no twisting or bending strain imparted to the tie bar.

In order to limit the turning movement of the truck about a vertical axis a stop 27 is provided on the underframe of the vehicle body which is contacted by the forward end 28 of the inner side member 4 of the wheel frame. This contact between the wheel frame and the stop 27 is brought about when the wheel frame turns in a clockwise direction as viewed in Fig. 2.

There is another stop 29 on the underframe of the vehicle body which is engaged by the end 30 of the side member 4 of the wheel frame when the wheel frame turns in a counterclockwise direction as viewed in Fig. 2.

This description has been applied to the truck as viewed at the lower side of Fig. 2. The opposed truck shown at the upper side of the figure engages similar stops 27' at the forward end thereof and stop 29' at the rear end thereof.

When the vehicle is traveling around a curve to the left, as indicated in Fig. 7, the flange of the forward wheel 8 engages the outer rail and guides the car around a very short radius curve. The wheel frame is forced against the stop 27' while the centrifugal force of the vehicle body transmitted to the truck frame through the king post tends to force the flange of the rear wheel 11 on the outside truck against the rail. However, the inner member of the wheel frame at the inner rail engages the stop 29 and this has the effect of centering the wheels 11, 11, on the opposed trucks with relation to the rails. The turning of the tie bar shortens the distance between the arms but the stop, which brings about a centering of the wheels on the rails, prevents either of the wheels adjacent the center of the car from dropping between the rails.

The trucks at opposite ends of the vehicle body are of like construction and operate in the same manner and further detailed description thereof is not thought necessary.

Figure 9:
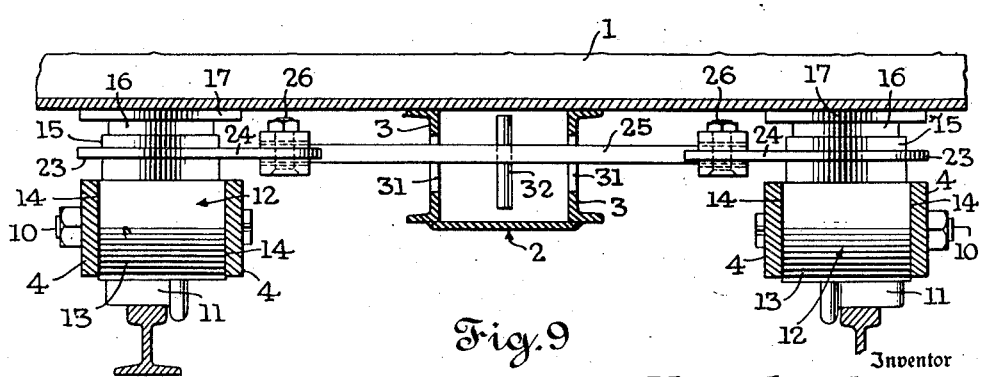

In Figs. 9 and 10 there is shown a slight modification in the means for limiting the oscillation of the wheel trucks about a vertical axis. The channels 3, 3, are slotted as indicated at 31. The tie bar 25 passes through these slots. A pin 32 carried by the tie bar projects above and below the same. This pin is of greater length than the slots. When the tie bar is moved to the right, as viewed in Fig. 9, the pin will contact with the inside of the channel and limit any further endwise movement of the tie bar. In a similar manner, the pin contacts with the other channel when the trucks oscillate in the opposite direction and limits the turning movement thereof.

From the above it will be apparent that the tie bar connection between the opposed trucks is so constructed and arranged that it does not in any way interfere with the oscillations of the wheel frames about horizontal axes even though the wheel frame is given an abnormal movement by passing off the end of a rail. Or, if one of the wheels should drop between the rails, there is no twisting strain of any kind brought to bear upon the tie bar. This is accomplished without in any way interfering with the positive transmission of turning movements of one of the trucks about a vertical axis to the opposed truck. Then again, if it ever should be derailed so that the trucks leave the rails completely, the stops will prevent the trucks from turning except for a limited extent relative to the underframe of the vehicle body.

It is obvious that many changes in the details of construction may be made without departing from the spirit of the invention as set forth in the appended claims.

I claim:

1. A rail vehicle including a body, axleless trucks for supporting said body, each truck comprising a wheel frame having spaced side members, a member connecting said spaced side members curved to conform to the desired center of vertical oscillation of the truck, a body supporting member disposed between said side members of the truck and resting on said curved member, said body supporting member having its under face curved to conform to the curvature of said supporting member, said body supporting member having the ends thereof shaped to conform and contact with the side members of the frame, wheels mounted in tandem on said wheel supporting frame, an arm carried by each body support, and a tie bar connecting said arms whereby horizontal turning movements of one truck are imparted to the opposed truck.

2. A rail vehicle including a body, axleless trucks for supporting said body, each truck comprising a wheel frame having spaced side members, a member connecting said spaced side members curved to conform to the desired center of vertical oscillation of the truck, a body supporting member disposed between said side members of the truck and resting on said curved member, said body supporting member having its under face curved to conform to the curvature of said supporting member, said body supporting member having the ends thereof shaped to conform and contact with the side members of the frame, wheels mounted in tandem on said wheel supporting frame, said underframe of the vehicle having a depending sleeve and said body supporting member having a telescoping connection with said sleeve whereby said body supporting member may move endwise relative to the sleeve and also oscillate on said sleeve about a vertical axis, springs disposed within said sleeve and said body supporting member for yieldingly carrying the vehicle body, an arm carried by each body support, and a tie bar connecting said arms whereby horizontal turning movements of one truck are imparted to the opposed truck.

3. A rail vehicle comprising a body, opposed truck engaging members at opposite sides of said body, a wheel truck associated with each of said members including a body support mounted on the truck engaging member for oscillations about a vertical axis, a rigid wheel frame mounted on said body support for oscillations in a vertical plane, flanged wheels mounted in tandem on said wheel supporting frame, each body support having an arm projecting therefrom, and a tie bar pivotally connected at its opposite ends to the arms of opposed trucks whereby horizontal turning movements of one truck are imparted to the opposed truck.

4. A rail vehicle comprising a body, opposed truck engaging members at opposite sides of said body, a wheel truck associated with each of said members including a body support mounted on the truck engaging member for oscillations about a vertical axis, a rigid wheel frame mounted on said body support for oscillations in a vertical plane, flanged wheels mounted in tandem on said wheel supporting frame, each body support having an arm projecting therefrom, a tie bar pivotally connected at its opposite ends to the arms of opposed trucks whereby horizontal turning movements of one truck are imparted to the opposed truck, each truck engaging member being free to move up and down in its body support, and springs disposed in said body support on which said vehicle body is mounted.

5. A rail vehicle comprising a body, opposed truck engaging members at opposite sides of said body, a wheel truck associated with each of said members including a body support mounted on the truck engaging member for oscillations about a vertical axis, a rigid wheel frame mounted on said body support for oscillations in a vertical plane, flanged wheels mounted in tandem on said wheel supporting frame, each body support having an arm extending substantially parallel to the wheel frame and terminating adjacent one of the wheels, and a tie bar pivotally connected at its opposite ends to the arms of opposed trucks whereby horizontal turning movements of one truck are imparted to the opposed truck.

6. A rail vehicle comprising a body, opposed truck engaging members at opposite sides of said body, a wheel truck associated with each of said members including a body support mounted on the truck engaging member for oscillations about a vertical axis, a rigid wheel frame mounted on said body support for oscillations in a vertical plane, flanged wheels mounted in tandem on said wheel supporting frame, each body support having an arm extending substantially parallel to the wheel frame and terminating adjacent one of the wheels, and a tie bar pivotally connected at its opposite ends to the arms of opposed trucks whereby horizontal turning movements of one truck are imparted to the opposed truck, said arms being disposed at the inner sides of the truck frames whereby a relatively short tie bar for connecting the same may be used.

7. A rail vehicle comprising a body, opposed truck engaging members at opposite sides of said body, a wheel truck associated with each of said members including a body support mounted on the truck engaging member for oscillations about a vertical axis, a rigid wheel frame mounted on said body support for oscillations in a vertical plane, flanged wheels mounted in tandem on said wheel supporting frame, each body support having an arm projecting therefrom, and a tie bar pivotally connected at its opposite ends to the arms of opposed trucks whereby horizontal turning movements of one truck are imparted to the opposed truck, and stops carried by the vehicle body for limiting the turning movements of the trucks about a vertical axis.

8. A rail vehicle comprising a body, opposed truck engaging members at opposite sides of said body, a wheel truck associated with each of said members including a body support mounted on the truck engaging member for oscillations about a vertical axis, a rigid wheel frame mounted on said body support for oscillations in a vertical plane, flanged wheels mounted in tandem on said wheel supporting frame, each body support having an arm projecting therefrom, a tie bar pivotally connected at its opposite ends to the arms of opposed trucks whereby horizontal turning movements of one truck are imparted to the opposed truck, and stops carried by the vehicle body and disposed so as to be engaged by the wheel frame for limiting the turning movement of the trucks about vertical axes.

9. A rail vehicle comprising a body, opposed truck engaging members at opposite sides of said body, a wheel truck associated with each of said members including a body support mounted on the truck engaging member for oscillations about a vertical axis, a rigid wheel frame mounted on said body support for oscillations in a vertical plane, flanged wheels mounted in tandem on said wheel supporting frame, each body support having an arm projecting therefrom, a tie bar pivotally connected at its opposite ends to the arms of opposed trucks whereby horizontal turning movements of one truck are imparted to the opposed truck, and a pair of stops carried by the vehicle body for each truck, said tops being disposed between the trucks so as to be contacted with by the end of the wheel frame on the inward turning movement thereof.

HENRY FORT FLOWERS.

REFERENCES CITED

The following references are of record in the file of this patent:

UNITED STATES PATENTS

| Number | Name | Date |
| --- | --- | --- |
| 2,377,768 | Edgar | June 5, 1945 |
| 999,192 | Kellogg | July 25, 1911 |
| 2,063,545 | Flowers | Dec. 8, 1936 |
| 2,250,554 | Schroeder | July 29, 1941 |
| 2,286,967 | Kepner | June 16, 1942 |

FOREIGN PATENTS

| Number | Country | Date |
| --- | --- | --- |
| 443,762 | Great Britain | Mar. 5, 1936 |